(12) United States Patent
Noguchi

(10) Patent No.: US 7,744,097 B2
(45) Date of Patent: Jun. 29, 2010

(54) REAR WHEEL SUSPENSION DEVICE FOR TWO-WHEEL VEHICLE

(75) Inventor: Nobuhiro Noguchi, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 572 days.

(21) Appl. No.: 11/730,677

(22) Filed: Apr. 3, 2007

(65) Prior Publication Data

US 2007/0252349 A1 Nov. 1, 2007

(30) Foreign Application Priority Data

Apr. 26, 2006 (JP) ............................. 2006-121548

(51) Int. Cl.
*B60G 17/056* (2006.01)
(52) U.S. Cl. ...................... 280/5.5; 188/314; 267/62.26
(58) Field of Classification Search .................. 280/5.5; 188/275, 297, 314, 318; 267/64.26
See application file for complete search history.

(56) References Cited

U.S. PATENT DOCUMENTS

| | | | |
|---|---|---|---|
| 4,153,237 A * | 5/1979 | Supalla | 267/64.15 |
| 4,732,244 A * | 3/1988 | Verkuylen | 188/318 |
| 4,958,706 A * | 9/1990 | Richardson et al. | 188/319.1 |
| 6,659,241 B2 * | 12/2003 | Sendrea | 188/314 |
| 6,722,678 B2 * | 4/2004 | McAndrews | 280/285 |

FOREIGN PATENT DOCUMENTS

JP 2002-048719 2/2002

* cited by examiner

*Primary Examiner*—Paul N. Dickson
*Assistant Examiner*—Timothy Wilhelm
(74) *Attorney, Agent, or Firm*—Rabin & Berdo, PC

(57) ABSTRACT

A hydraulic cushion unit (1) is interposed between a frame and a rear wheel axle of a bicycle. A surplus hydraulic oil discharging passage (31a) discharges surplus hydraulic oil from the hydraulic cushion unit (1) to an accumulator (2) in contraction. A damping force generating valve (3) which maintains a closed state below a predetermined cracking pressure is disposed in the surplus hydraulic oil discharging passage (31a). A bypass passage (4) which bypasses the damping force generating valve (3) and a bypass valve (4) which opens and closes the bypass passage (L) are further provided. By closing the bypass valve (4) when pedaling of the bicycle is performed to start the bicycle, squatting of the bicycle is prevented while maintaining a shock absorbing function of the damping force generating valve (3).

13 Claims, 2 Drawing Sheets

REAR WHEEL SUSPENSION DEVICE FOR TWO-WHEEL VEHICLE

FIELD OF THE INVENTION

This invention relates to a rear wheel suspension device for a two-wheel vehicle, more specifically to damping force control of a cushion unit in order to prevent squatting of the vehicle when the vehicle starts to move.

BACKGROUND OF THE INVENTION

JP2002-048719A, published by the Japan Patent Office in 2002, proposes a rear wheel suspension device for a bicycle using a gas spring type cushion unit.

The cushion unit comprises a cylinder filled with gas, a piston enclosed in the cylinder, and a piston rod connected to the piston and projecting from the cylinder. The piston rod is connected to a frame of the bicycle and the cylinder is connected to a rear wheel axle.

The piston delimits two operation chambers in the cylinder. These chambers are connected to each other via a valve provided outside the cylinder. The valve has a section which connects the chambers directly and a section which connects the cylinders via a check valve. The check valve shuts off a gas flow generated when the piston rod invades the cylinder while allowing a gas flow generated when the piston rod projects from the cylinder.

When the check valve shuts off the gas flow, gas in the chamber beneath the piston can no longer escape, and therefore contracts within the chamber. As a result, the spring constant of the gas spring against contraction of the piston rod becomes greater than in the case where the check valve does not shut off the gas flow.

When pedals are depressed strongly to start the bicycle, or in other words pedaling is performed to start the bicycle, squatting of the bicycle, a phenomenon in which the bicycle frame is pushed down onto the rear wheel due to a temporal increase in the load on the rear wheel, occurs. When squatting occurs, a large compression load acts on the gas spring. By causing the valve to shut off the gas flow generated by contraction of the cushion unit, the spring constant of the cushion unit is increased and the sinking of the bicycle frame onto the rear wheel is suppressed to be small. In contrast, when the bicycle is running normally, the valve is operated to interconnect the two chambers, thereby ensuring riding comfort under a smaller spring constant.

SUMMARY OF THE INVENTION

In order to prevent squatting of the bicycle from occurring, it is preferable to lock the contraction of the piston rod temporarily, but the prior art cushion unit using a gas spring cannot lock the contraction of the piston rod inherently, and hence complete prevention of squatting cannot be expected.

It is therefore an object of this invention to provide a rear wheel suspension device for two-wheel vehicle having preferable damping force characteristics including a characteristic for the prevention of squatting.

In order to achieve the above object, this invention provides a rear wheel suspension device for a two-wheel vehicle, comprising a hydraulic cushion unit interposed between a frame and a rear wheel axle of the two-wheel vehicle, a surplus hydraulic oil discharging passage which discharges surplus hydraulic oil from the hydraulic cushion unit in contraction, an accumulator connected to the surplus hydraulic oil discharging passage, a compression damping force generating valve disposed in the surplus hydraulic oil discharging passage, a bypass passage which bypasses the compression damping force generating valve, and a bypass valve which opens and closes the bypass passage.

The compression damping force generating valve is constructed to maintain a closed state when a pressure in the surplus hydraulic oil discharging passage is not higher than a predetermined cracking pressure.

The details as well as other features and advantages of this invention are set forth in the remainder of the specification and are shown in the accompanying drawings.

DESCRIPTION OF THE PREFERRED EMBODIMENTS

Figure 1:
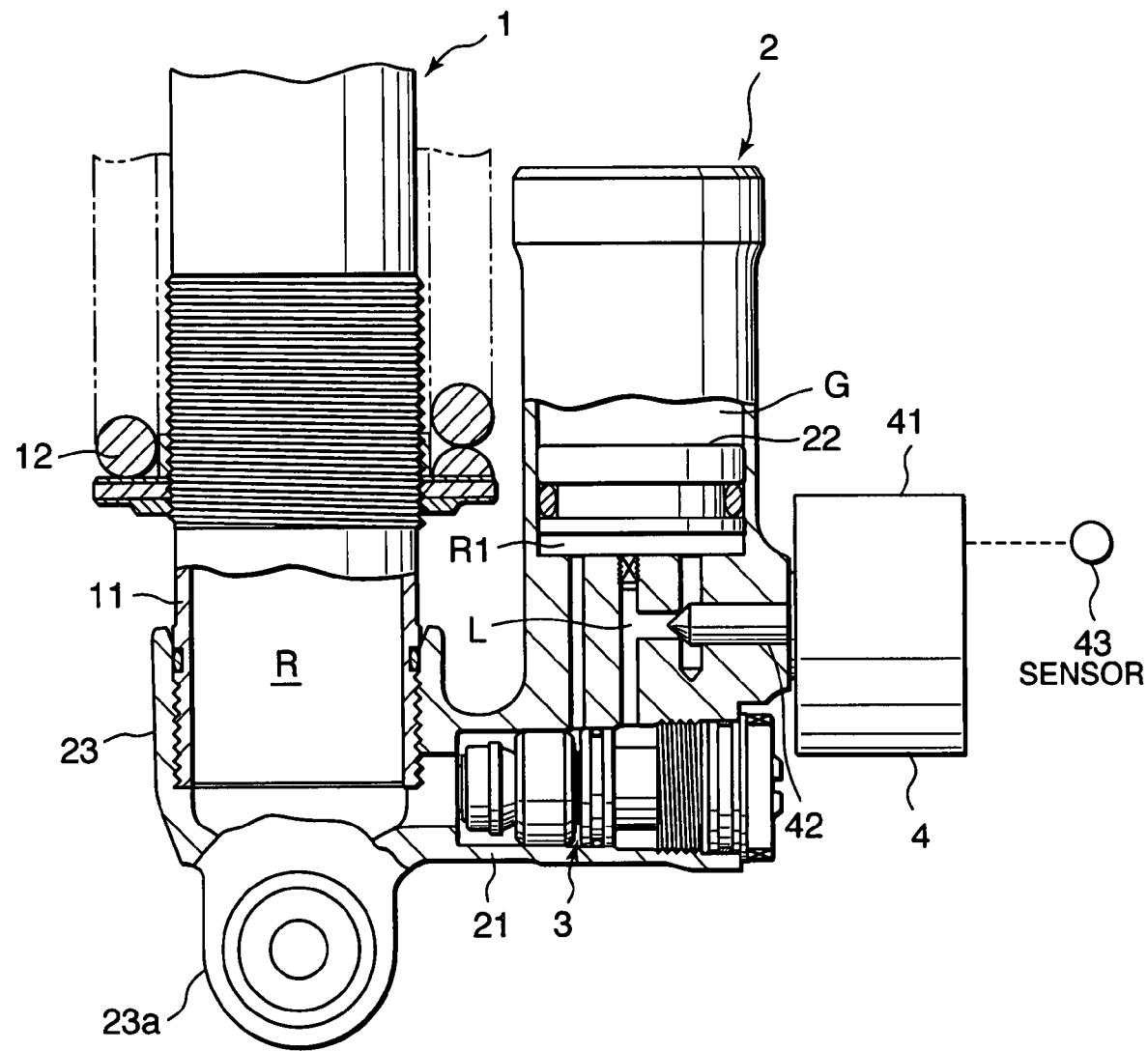
FIG. 1 is a side view of essential parts of a rear wheel suspension device for a bicycle according to this invention, including a partial longitudinal sectional view.

Referring to FIG. 1 of the drawings, a rear wheel suspension device interposed between a frame and a rear wheel axle of a bicycle comprises a hydraulic cushion unit 1, an accumulator 2, and a housing 21 in which a compression damping valve 3 is enclosed.

The hydraulic cushion unit 1 comprises a cylinder 11, a piston enclosed in the cylinder 11, and a piston rod connected to the piston and projecting from the cylinder. The piston rod is connected to a frame of the bicycle. The cylinder 11 is connected to a rear wheel axle via a bottom member 23 and an eye 23*a* formed as a part thereof, as shown in the figure. The bottom member 23 also has a function to close an opening at a lower end of the cylinder 11.

The piston delimits two hydraulic oil chambers in the cylinder 11. The hydraulic oil chambers connect to each other via passages formed through the piston under a predetermined flow resistance. The hydraulic oil chamber delimited beneath the piston is represented as a hydraulic oil chamber R in the figure.

When the hydraulic cushion unit 1 contracts, the piston is pushed down in the cylinder 11 and an amount of hydraulic oil corresponding to a penetration volume of the piston rod into the cylinder 11 flows out from the hydraulic oil chamber R to an accumulator 2 via a passage formed in the valve housing 21. When the hydraulic cushion unit 1 elongates, the piston ascends in the cylinder 11 and an amount of hydraulic oil corresponding to a projection volume of the piston rod from the cylinder 11 is aspirated into the hydraulic oil chamber R from the accumulator 2 via a passage formed in the valve housing 21.

The accumulator 2 encloses a free piston 22. The free piston 22 delimits the inner space of the accumulator 2 into a gas chamber G above the free piston 22 and a hydraulic oil chamber R1 beneath the free piston 22.

The suspension device further comprises a coil spring 12 interposed between the bicycle frame and the rear wheel axle on the outside of the cylinder 11. The coil spring 12 applies a resilient force to the piston rod so as to cause the piston rod to project from the cylinder 11

Figure 2:
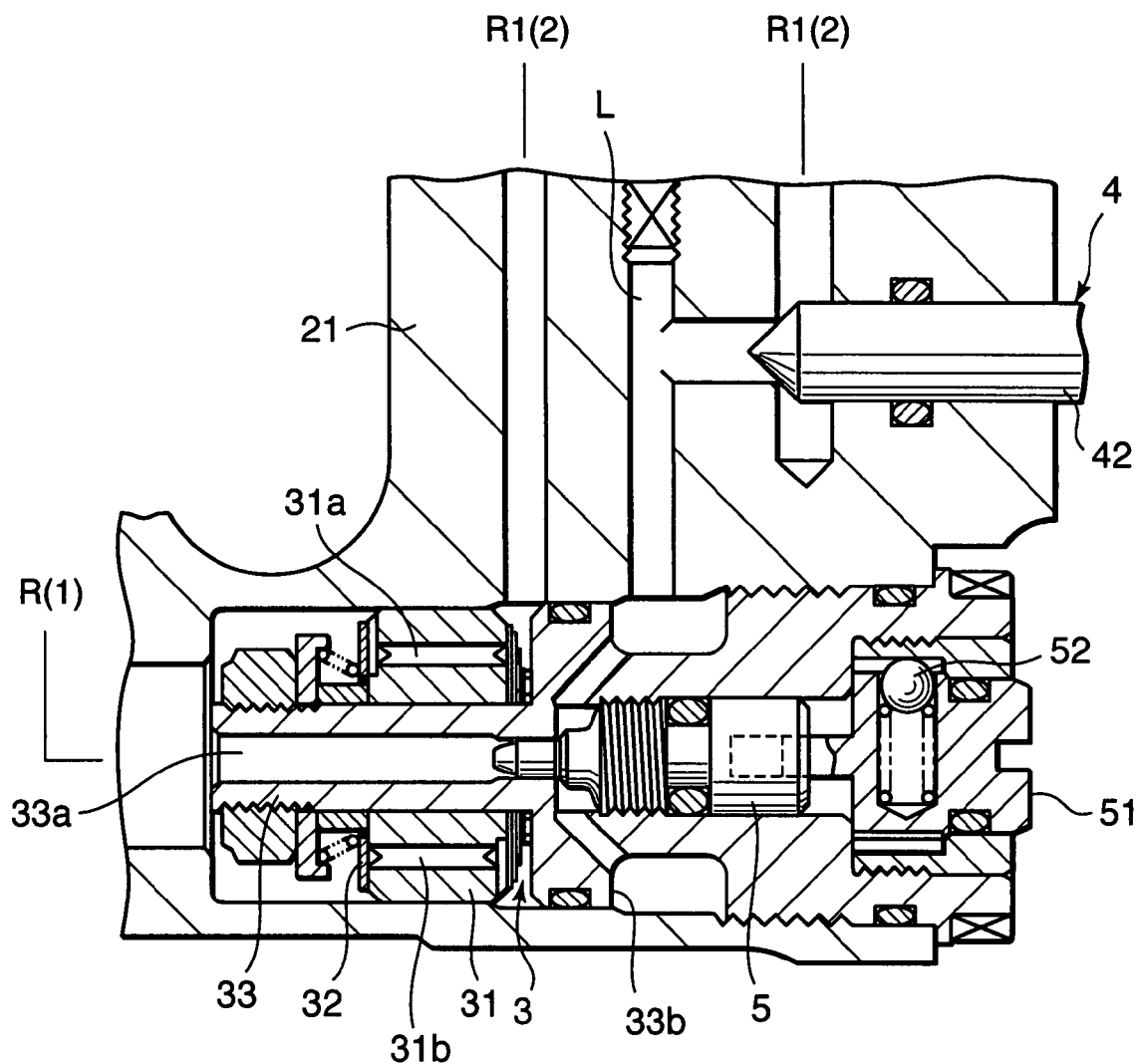
FIG. 2 is a longitudinal sectional view of hydraulic oil passages and related structures provided in the rear wheel suspension device.

Referring to FIG. 2, hydraulic oil passages are formed in the valve housing 21 which connect the hydraulic oil chamber R in the cylinder 11 and the hydraulic oil chamber R1 in the accumulator 2, and a compression damping valve 3 and a check valve 32 are disposed in these hydraulic oil passages.

The compression damping valve 3 and the check valve 32 function cooperatively. Specifically, a valve seat 31 is formed across the hydraulic oil passages, and a surplus hydraulic oil discharge passage 31a and a deficiency hydraulic oil supply passage 31b are formed respectively through the valve seat 31. The compression damping valve 3 is disposed facing openings of the passages 31a and 31b, while the check valve 32 is disposed facing the other openings of the passages 31a and 31b. The valve seat 31 is fitted on the outer circumference of a center rod 33 inserted into the valve housing 21. The compression damping valve 3 and the check valve 32 are also fitted on the outer circumference of the center rod 33.

With respect to the flow of hydraulic oil from the hydraulic oil chamber R to the accumulator 2 in the surplus hydraulic oil discharge passage 31a, the compression damping valve 3 does not open until the hydraulic oil pressure in the surplus hydraulic oil discharge passage 31a reaches a predetermined cracking pressure. When the hydraulic oil pressure exceeds the predetermined cracking pressure, the compression damping valve 3 opens and allows a flow of hydraulic oil from the hydraulic oil chamber R to the accumulator 2 while generating a damping force. The compression damping valve 3 maintains the surplus hydraulic oil discharge passage 31a in a closed state with respect to a flow of hydraulic oil in the reverse direction. The compression damping valve 3 does not affect a flow of hydraulic oil in the deficiency hydraulic oil supply passage 31b irrespective of the flow direction.

The check valve 32 allows a flow of hydraulic oil from the accumulator 2 to the hydraulic oil chamber R1 though the deficiency hydraulic oil supply passage 31b, while maintaining the deficiency hydraulic oil supply passage 31b in a closed state with respect to a flow of hydraulic oil from the hydraulic oil chamber R to the accumulator 2. The check valve 32 does not affect a flow of hydraulic oil in the surplus hydraulic oil discharge passage 31a.

As a result, when hydraulic oil is discharged from the hydraulic oil chamber R due to contraction of the piston rod in the hydraulic cushion unit 1, the compression damping valve 3 opens when the hydraulic oil pressure in the surplus hydraulic oil discharge passage 31b exceeds the cracking pressure, and then hydraulic oil is discharged from the hydraulic oil chamber R to the accumulator 2 under a predetermined resistance. When hydraulic oil is aspirated from the accumulator 2 into the hydraulic oil chamber due to elongation of the piston rod in the hydraulic cushion unit 1, hydraulic oil passes the deficiency hydraulic oil supply passage 31b without undergoing resistance.

Inside the valve housing 21, a bypass passage L is further formed so as to bypass the compression damping valve 3 and the check valve 32, thereby connecting the hydraulic oil chamber R of the cylinder 11 and the hydraulic oil chamber R1 of the accumulator 2. The bypass passage L passes through a center portion 33a of the center rod 33, and is led to the hydraulic oil chamber R1 via an annular groove 33b formed on the outer circumferential surface of the center rod 33.

In the bypass passage L, an adjuster 5 which adjusts the flow resistance of hydraulic oil in the bypass passage L and a bypass valve 4 which opens and closes the bypass passage L are disposed in series.

The adjuster 5 is constituted by a needle-like member which is inserted into the center portion of the center rod 33 from outside concentrically with the center rod 33 so as to face the bypass passage L. The adjuster 5 is screwed into the inner circumferential surface of the center rod 33. According to the rotational operation of a rear part 51 exposed to the outside of the housing 21, the adjuster 5 advances into or retreats from the bypass passage L so as to vary a flow sectional area of the bypass passage L. The adjuster 5 is provided with a detent mechanism 52 for rotational positioning.

The hydraulic oil discharged from the hydraulic oil chamber R into the bypass passage L first passes through the adjuster 5, then flows into the annular groove 33b, and further passes through the bypass valve 4 to reach the hydraulic oil chamber R1 in the accumulator 2.

The bypass valve 4 comprises a needle-shaped valve body 42 driven by a solenoid 41. The solenoid 41 is fixed onto the exterior of the housing 21. The valve body 42 projects from the solenoid 41 into the housing 21. The solenoid 41, according to signals input from outside, displaces the valve body between a fully closed position in which the valve body 42 is seated on a valve seat formed across the bypass passage L and a fully open position in which the valve body 42 is detached from the valve seat.

Herein, the signals input into the solenoid 41 are generated by a sensor 43 which detects pedaling of the bicycle, i.e., depression of the pedals. In response to the signals generated by the sensor 43, the bypass valve 4 fully opens the bypass passage L in a non-pedaling state of the bicycle and fully closes the same in a pedaling state of the bicycle.

Referring again to FIG. 1, the valve housing 21 is constructed integrally with the bottom member 23 and a housing of the accumulator 2. According to this construction, by simply fixing the eye 23a onto the rear wheel axle of the bicycle, positioning of the accumulator 2 is performed automatically.

Next, the operation of the rear wheel suspension device will be described.

When pedaling is performed in order to start the bicycle, i.e., the bicycle is in the pedaling state, the bypass valve 4 fully closes the bypass passage L. Pedaling exerts a compression load on the hydraulic cushion unit 1 supporting the rear wheel on the bicycle frame. Under this compression load, the piston rod of the cushion unit 1 penetrates the cylinder 11 so as to push the piston downward. As a result of this action, an amount of hydraulic oil corresponding to the penetration volume of the piston rod into the cylinder 11 is discharged from the hydraulic oil chamber R to the hydraulic oil chamber R1 of the accumulator 2.

Since the bypass passage L is fully closed by the bypass valve 4, the discharged hydraulic oil flows into the surplus hydraulic oil discharge passage 31b, pushes the compression damping valve 3 to open, and reaches the hydraulic oil chamber R1 of the accumulator 2. However, the compression damping valve 3 does not open until the pressure in the hydraulic oil chamber R has exceeded the cracking pressure of the compression damping valve 3 thereby maintaining the hydraulic cushion unit 1 in an oil-lock state. Pedaling of the bicycle is performed in this oil-lock state, and hence squatting of the bicycle in which the bicycle frame is pushed down onto the rear does not occur.

On the other hand, when an upward shock load acts on the rear wheel while pedaling due to undulation of the traveling surface, the hydraulic cushion unit 1 receives a large compression load. In this case, the rapidly increasing hydraulic oil pressure in the hydraulic oil chamber R exceeds the cracking pressure of the compression damping valve 3 and the compression damping valve 3 opens to allow hydraulic oil to flow from the hydraulic oil chamber R to the hydraulic oil chamber R1 under a predetermined flow resistance.

According to the rear wheel suspension device, therefore, the shock during pedaling of the bicycle can be suppressed while preventing squatting of the bicycle due to pedaling.

The hydraulic cushion unit 1 thus contracted elongates again as soon as the upward shock load dissipates due to a resilient force of the coil spring 12 and a gas pressure in the gas chamber G. According to this rebound action, an amount of hydraulic oil corresponding to a projection volume of the piston rod from the cylinder 11 is aspirated into the hydraulic oil chamber R from the hydraulic oil chamber R1. This hydraulic oil flow is formed through the deficiency hydraulic oil supply passage 31b without undergoing substantial flow resistance.

It should be noted that when the hydraulic cushion unit 1 elongates, the hydraulic oil chamber above the piston moves to the hydraulic oil chamber R via a passage formed through the piston under a predetermined resistance. The rebound damping force of the hydraulic cushion unit 1 is obtained by this flow resistance.

When the bicycle is running without pedaling, i.e., the bicycle is in the no-pedaling state, the bypass valve 4 fully opens the bypass passage L.

When a compression load acts on the hydraulic cushion unit 1 in this state, an amount of hydraulic oil corresponding to the penetration volume of the piston rod into the cylinder 11 is discharged from the hydraulic oil chamber R to the hydraulic oil chamber R1 of the accumulator 2.

Since the bypass passage L is fully open, the discharged hydraulic oil flows into the hydraulic oil chamber R1 from the hydraulic oil chamber R via the bypass passage L which allows hydraulic oil flow even when the pressure in the hydraulic oil chamber R is lower than the cracking pressure of the compression damping valve 3. In other words, the hydraulic cushion unit 1 contracts under a smaller damping force than in the pedaling state. The damping force generated in this no-pedaling state depends on the flow resistance of the adjuster 5. When the hydraulic cushion unit 1 elongates again after contraction, hydraulic oil in the hydraulic oil chamber R1 is recirculated into the chamber R via the deficiency hydraulic oil supply passage 31b without a substantial flow resistance as in the pedaling state.

When pedaling is not performed, shock absorbing of the rear wheel is performed under a smaller damping force than in the pedaling state and a comfortable ride quality is obtained. The compression damping force generated in this state can be adjusted by the rotational operation of the adjuster 5. For example, different damping force characteristics can be varied depending on running conditions such as off-road running or on-road running.

Even in the no-pedaling state, when the compression load on the hydraulic cushion unit 1 rapidly increases and the hydraulic oil pressure in the hydraulic oil chamber R exceeds the cracking pressure of the compression damping valve 3, the compression damping valve 3 opens to help to discharge hydraulic oil from the hydraulic oil chamber R into the hydraulic oil chamber R1. A rapid increase in the damping force can therefore be further suppressed in comparison with a case where the damping force is generated depending only on the adjuster 5, and hence the shock absorbing performance of the hydraulic cushion unit 1 can be improved.

In this suspension device, the bypass valve 4 which switches the damping force characteristics between the pedaling state and no-pedaling state is disposed in the bypass passage L. When the pressure in the bypass passage L exceeds the cracking pressure of the compression damping valve 3, the compression damping valve 3 opens, and hence the pressure in the bypass passage L hardly exceeds the cracking pressure. The operation force required for opening and closing of the bypass valve 4 can therefore be suppressed to be small.

As described hereintofore, the rear wheel suspension device according to this invention prevents squatting of a bicycle more securely than the prior art device in which the cushion unit supporting the rear wheel is constituted by a gas spring.

In the prior art device, as a rebound to contraction of the cushion unit when the rear wheel passes over a projection on the traveling surface, the cushion unit elongates rapidly immediately after the rear wheel passes over the projection, thereby reducing the riding comfort of the bicycle. The rear wheel suspension device according to this invention absorbs a shock exerted on the rear wheel by a damping force, and hence the rebound is suppressed to be small. As a result, the riding quality of the bicycle is always maintained at a preferred level.

The contents of Tokugan 2006-121548, with a filing date of Apr. 26, 2006 in Japan, are hereby incorporated by reference.

Although the invention has been described above with reference to a certain embodiment of the invention, the invention is not limited to the embodiment described above. Modifications and variations of the embodiment described above will occur to those skilled in the art, within the scope of the claims.

For example, the signals input into the solenoid 41 to drive the bypass valve 4 may be input manually instead of installing the sensor 43 to generate them.

Further, it is possible to construct the bypass valve 4 to function as a relief valve not to open when the pressure of the bypass passage L is low. If the bypass valve 4 is constructed in this way, by setting the cracking pressure of the compression damping valve 3 and the relief pressure of the bypass valve 4 appropriately, the damping force characteristics of the hydraulic cushion unit 1 can be varied in a multiple-step fashion.

In the embodiment described above, the hydraulic cushion unit 1 is constituted by an upright type in which the cylinder 11 is connected to the rear wheel axle and the piston rod is connected to the bicycle frame. However, this invention can be applied to an inverted type hydraulic cushion unit in which the piston rod is connected to the rear wheel axle and the cylinder is connected to the bicycle frame.

Further, this invention should not be limited to a rear wheel suspension device for a bicycle. It can also be applied to a rear wheel suspension device for a motor cycle, in which the rear wheel is caused to rotate by an engine of the motorcycle.

The embodiments of this invention in which an exclusive property or privilege is claimed are defined as follows:

What is claimed is:

1. A rear wheel suspension device for a two-wheel vehicle, comprising:
   a hydraulic cushion unit interposed between a frame and a rear wheel axle of the bicycle;
   a surplus hydraulic oil discharging passage which discharges surplus hydraulic oil from the hydraulic cushion unit in contraction;
   an accumulator connected to the surplus hydraulic oil discharging passage;
   a compression damping force generating valve disposed in the surplus hydraulic oil discharging passage, the compression damping force generating valve maintaining a closed state when a pressure in the surplus hydraulic oil discharging passage is not higher than a predetermined cracking pressure;
   a bypass passage which bypasses the compression damping force generating valve; and
   a bypass valve which opens and closes the bypass passage in response to an external input signal.

2. The suspension device as defined in claim 1, further comprising an adjuster which adjusts a flow resistance of the bypass passage.

3. The suspension device as defined in claim 1, wherein the bypass valve comprises a relief valve which opens when a pressure in the bypass passage becomes greater than a predetermined relief pressure.

4. The suspension device as defined in claim 1, further comprising a check valve which prevents a reverse flow from occurring in the surplus hydraulic oil discharging passage.

5. The suspension device as defined in claim 1, further comprising a deficiency hydraulic oil supply passage which supplies hydraulic oil from the accumulator to the hydraulic cushion unit when elongated.

6. The suspension device as defined in claim 1, wherein the accumulator, the surplus hydraulic oil discharging passage, the compression damping force generating valve, the bypass passage, and the bypass valve are disposed in a housing.

7. The suspension device as defined in claim 6, wherein the hydraulic cushion unit comprises an eye for connecting the cushion unit to the rear wheel axle, and the housing is constructed integrally with the eye.

8. The suspension device as defined in claim 1, further comprising a suspension spring which exerts a resilient force on the hydraulic cushion unit in the direction of elongation.

9. The suspension device as defined in claim 1, wherein the two-wheel vehicle is a bicycle; further comprising:
a sensor which detects pedaling of the bicycle and outputs the input signal, so that the bypass valve closes the bypass passage when pedaling is detected.

10. The suspension device as defined in claim 1, wherein the two-wheel vehicle includes means for causing a rear wheel thereof to rotate so as to propel the two-wheel vehicle in a forward direction; further comprising:
a sensor which detects an activation of said means and outputs the input signal, so that the bypass valve closes the bypass passage when said input signal is detected.

11. The suspension device as defined in claim 1, wherein the bypass valve includes a solenoid which is activatable in response to the external input signal to thereby cause said bypass valve to open and close.

12. A rear wheel suspension device for a bicycle, comprising:
a hydraulic cushion unit interposed between a frame and a rear wheel axle of the bicycle;
a surplus hydraulic oil discharging passage which discharges surplus hydraulic oil from the hydraulic cushion unit in contraction;
an accumulator connected to the surplus hydraulic oil discharging passage;
a compression damping force generating valve disposed in the surplus hydraulic oil discharging passage, the compression damping force generating valve maintaining a closed state when a pressure in the surplus hydraulic oil discharging passage is not higher than a predetermined cracking pressure;
a bypass passage which bypasses the compression damping force generating valve; and
a bypass valve which opens and closes the bypass passage, the bypass valve being constructed to operate in response to an input signal from a sensor which detects pedaling of the bicycle, and closes the bypass passage when pedaling is detected.

13. A rear wheel suspension device for a two-wheel vehicle, comprising:
a hydraulic cushion unit interposed between a frame and a rear wheel axle of the two-wheel vehicle;
a surplus hydraulic oil discharging passage which discharges surplus hydraulic oil from the hydraulic cushion unit in contraction;
an accumulator connected to the surplus hydraulic oil discharging passage;
a compression damping force generating valve disposed in the surplus hydraulic oil discharging passage, the compression damping force generating valve maintaining a closed state when a pressure in the surplus hydraulic oil discharging passage is not higher than a predetermined cracking pressure;
a bypass passage which bypasses the compression damping force generating valve; and
a bypass valve which opens and closes the bypass passage, the bypass valve comprising a needle-shaped valve body which linearly displaces according to energization of a solenoid, the solenoid being fixed on the outer side of the housing, and the valve body projecting from the solenoid into the housing to displace between a seated position in which the valve body is seated on a valve seat formed across the bypass passage and a detached position in which the valve body is detached from the valve seat.

* * * * *